Jan. 13, 1959     R. D. KOBS     2,867,946
METHOD OF FORMING SEED STARTERS
Filed June 13, 1957
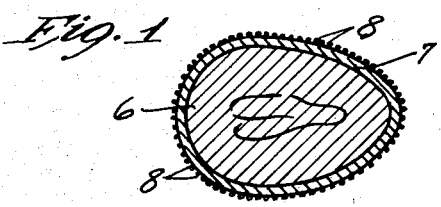
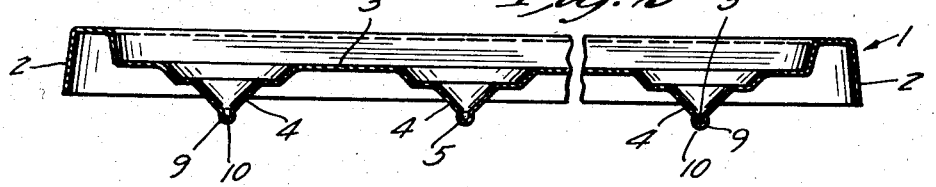
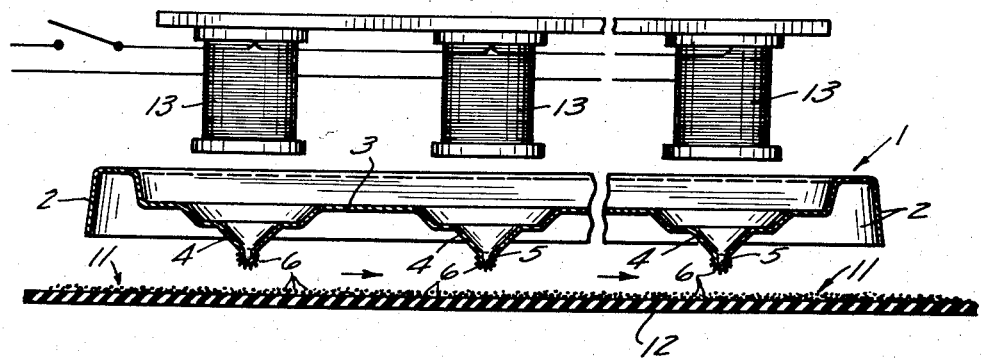
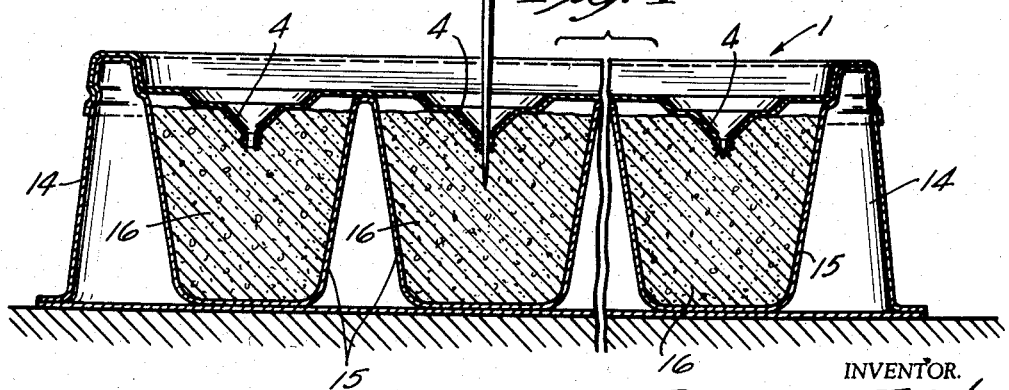
INVENTOR.
Roger D. Kobs
BY
Merchant & Merchant
ATTORNEYS

United States Patent Office 2,867,946
Patented Jan. 13, 1959

2,867,946

METHOD OF FORMING SEED STARTERS

Roger D. Kobs, Minneapolis, Minn., assignor to Northrup, King & Co., Minneapolis, Minn., a corporation of Minnesota Application June 13, 1957, Serial No. 665,409

2 Claims. (Cl. 47—58)

My invention relates generally to devices for the germinating of seeds for subsequent transplanting and more specifically to a novel method of uniformly affixing the seeds to the spaced relatively pointed undersurfaces of generally concave moisture-receiving wells formed in the plate-like tops of seed starters of the type such as disclosed in my copending application, Serial No. 642,871, filed February 27, 1957, now abandoned, and in the continuation application thereof, Serial No. 733,801 filed May 5, 1958, and entitled "Combination Seed Merchandising and Germinating Package."

Heretofore, I have lowered the adhesively treated pointed undersurfaces of the plate-like tops of such seed starters into a bed of seeds of the desired type. However, this method has not resulted in a uniform number of seeds being affixed to the several adhesively treated pointed undersurfaces of the wells and hence has proved unsatisfactory.

The primary object of my invention is the provision of a novel method whereby a relatively uniform number of seeds may be positively affixed to the pointed undersurfaces of the tops of said seed starters.

A further object of my invention is the provision of a method of the type above described which is relatively inexpensive to practice and which is conducive to large scale operations.

A still further object of my invention is the provision of a method of the type above described including the steps of applying a coating of water soluble adhesive to a quantity of such seeds, exposing said seeds to powdered magnetic-responsive metal while said adhesive is still in a tacky state whereby each of said seeds is caused to pick up a coating of said metal, drying said adhesive, applying a water soluble adhesive to the pointed undersurfaces of said concave wells, passing said top over a bed of seeds so metallically treated while the adhesive on the tips thereof is still in a tacky state, and momentarily applying a magnetic field to said seeds through said top whereby to cause said seeds to impinge upon the tacky surfaces of said tips with sufficient force to remain in engagement therewith when the adhesive on said tips is dried.

The above and still further objects of my invention will become apparent from the following detailed specification, appended claims, and attached drawings.

Referring to the drawings wherein like characters indicate like parts throughout the several views:

Fig. 1 is a transverse sectional view of a seed treated in accordance with my invention;

Fig. 2 is a view in transverse section of the top of a seed starter of the type involving my invention, parts thereof being treated in accordance with my novel method;

Fig. 3 is a view corresponding to Fig. 2, but showing a schematic view of same during a further step in my novel method; and Fig. 4 is an enlarged longitudinal sectional view of a completed seed planter after treatment thereof by my novel method.

Referring with greater particularity to the drawings, the numeral 1 indicates in its entirety a cover element of the type utilized in my novel seed starters, the continuous depending maginal flange of which is identified by the numeral 2, the plate-like top by the numeral 3, and the generally concave moisture-receiving wells of which are identified in their entirety by the numeral 4. The top 1, as indicated in my copending application, is formed from suitable sheet material such as transparent plastic, the depending points or tits of the wells 4 being identified by the numeral 5.

As a first step in my novel method, a quantity of seeds 6 are coated with any adhesive of the type readily soluble in water, the peripheral coating being identified by the numeral 7. Obviously, this coating 7 may be applied in any given manner such as by spraying a thin layer of same on the seeds 6 while on an agitating conveyor belt.

While the adhesive coating 7 is still in a tacky state, the seeds 6 are exposed to finely powdered magnetic-responsive metal, preferably of the ferrous type, whereby each seed 6 is caused to pick up a coating 8 of such metal. The adhesive coating 7, with the metallic coating 8 imbedded therein, is then caused or permitted to dry by natural or artificial means.

As a next step in my novel method, the undersurfaces 9 of the depending points or tits 5 are also coated with any adhesive readily soluble in water, the coating being identified by the numeral 10, see particularly Fig. 2. While the adhesive coating 10 on the undersurfaces 9 of the points 5 is still in a tacky state, the top 1 in the position of Fig. 2, is passed over a bed 11 of seeds 6 so adhesively and metallically coated, as shown in Fig. 3. There, the bed 11 is shown as being supported on a suitable conveyor belt or the like 12. It will be noted that in overlying spaced relationship to the belt 12, a plurality of suitable electromagnets 13 are positioned so as to have a maximum effect upon the adhesive coatings 10 when momentarily energized. This momentary energization of the electromagnets 13 causes the metallically treated seeds 6, responsive to the magnetic field thus created, to be impinged with considerable force upon the undersurface of the plate-like top 3 including the adhesively treated undersurface portions 9 of the points 5. This impingement by magnetic attraction causes a relatively uniform number of the metallically treated seeds 6 to engage the undersurface portions 9 of the points 5—and with sufficient force to cause same to be lodged in the adhesive coating 10 until the adhesive coating 10 is dried. Obviously, deenergization of the magnetic field passing through the cover 1 permits all of the metallically treated seeds 6 to return to the bed 11 except those which have become adhered to the adhesive coating 10 on the undersurfaces 9 of the points 5.

Finally, the adhesive coating 10 on the undersurface 9 of the points 5, and with the treated seeds 6 imbedded therein, is caused to dry by natural or artificial means whereupon the cover elements 1 are placed upon cooperating containers 14 with the wells 4 centered with respect to cooperating pots 15 with the said depending points 5 imbedded in the potting material 16. Eventual loosening of the treated seeds 6 from their adhesive coatings 10, for the purpose of initiating germination, is effected by filling the several wells 4 with water and thereafter perforating the points 5 with a sharp instrument 17, see Fig. 4, all as more particularly described in my above identified copending application.

My invention has been thoroughly tested and found to be completely satisfactory for the accomplishment of the above objects, and while I have described a preferred embodiment thereof, same may well be capable of modification without departure from the scope and spirit of the appended claims.

What I claim is:

1. The method of uniformly affixing magnetically responsive metal coated seeds to spaced undersurfaces of generally concave wells formed in plate-like tops of seed starters, said method comprising applying a water soluble adhesive to the undersurfaces of said concave wells, passing said top over and in spaced relationship to a bed of seeds so metallically treated while the adhesive on said concave undersurfaces is still in a tacky state, and applying a metallic field to said metallically treated seeds through said top whereby to cause said seeds to impinge upon the tacky undersurfaces with sufficient force to remain in engagement therewith when said adhesive is dried.

2. The method of uniformly affixing magnetically responsive metal coated seeds to spaced undersurfaces of generally concave wells formed in plate-like tops of seed starters, said method comprising applying a water soluble adhesive to the undersurfaces of said concave wells, passing said top over and in spaced relationship to a bed of seeds so metallically treated while the adhesive on said concave undersurfaces is still in a tacky state, and momentarily applying a magnetic field to said seeds through said top to cause said seeds to impinge upon the tacky undersurfaces, deenergization of said magnetic field permitting return to said bed of all the seeds not directly in engagement with the adhesively treated surfaces.

References Cited in the file of this patent

UNITED STATES PATENTS

| | | |
|---|---|---|
| 523,991 | Oliver | Aug. 7, 1894 |
| 2,641,298 | Kinnear | June 9, 1953 |

FOREIGN PATENTS

| | | |
|---|---|---|
| 621,242 | Great Britain | Apr. 6, 1949 |